United States Patent
Hunnekuhl et al.

(10) Patent No.: US 10,962,140 B2
(45) Date of Patent: Mar. 30, 2021

(54) HAND LEVER

(71) Applicant: Georg Fischer Rohrleitungssysteme AG, Schaffhausen (CH)

(72) Inventors: Joerg Hunnekuhl, Jestetten (DE); Timo Jaeckle, Hilzingen (DE); Stefan Buergi, Basadingen (CH); Novica Lalevic, Buelach (CH)

(73) Assignee: Georg Fischer Rohrleitungssysteme AG

( * ) Notice: Subject to any disclaimer, the term of this patent is extended or adjusted under 35 U.S.C. 154(b) by 7 days.

(21) Appl. No.: 16/245,638

(22) Filed: Jan. 11, 2019

(65) Prior Publication Data

US 2019/0219191 A1 Jul. 18, 2019

(30) Foreign Application Priority Data

Jan. 18, 2018 (EP) .................. 18 152 343.2

(51) Int. Cl.
*F16K 35/02* (2006.01)
*F16K 31/60* (2006.01)

(52) U.S. Cl.
CPC .......... *F16K 35/025* (2013.01); *F16K 31/60* (2013.01); *F16K 31/602* (2013.01); *F16K 35/02* (2013.01); *F16K 31/607* (2013.01)

(58) Field of Classification Search
CPC ........ F16K 31/60; F16K 35/02; F16K 35/025; F16K 35/027; F16K 31/602; F16K 31/607
USPC ................................ 251/231, 232
See application file for complete search history.

(56) References Cited

U.S. PATENT DOCUMENTS

| 1,601,820 | A | * | 10/1926 | George | F16K 35/02 251/116 |
| 1,749,290 | A | * | 3/1930 | Lieske | F16K 35/02 137/382 |
| 4,266,441 | A | * | 5/1981 | Stordeur | B60H 1/0065 74/523 |
| 4,768,545 | A | * | 9/1988 | Hoffman | B60H 1/00857 137/315.05 |
| 5,496,010 | A | * | 3/1996 | Collyer | A61F 5/4405 251/231 |
| 9,797,522 | B1 | | 10/2017 | Del Real | |
| 9,816,635 | B2 | | 11/2017 | Jaeckle | |
| 9,945,491 | B2 | | 4/2018 | Stumpp et al. | |

(Continued)

FOREIGN PATENT DOCUMENTS

WO WO-2008/105056 A1 9/2008

*Primary Examiner* — Umashankar Venkatesan
(74) *Attorney, Agent, or Firm* — Harness, Dickey & Pierce, P.L.C.

(57) ABSTRACT

Hand lever, preferably produced from plastics material, for operating a valve, preferably a butterfly valve or a ball valve, including a lever and a locking plate, wherein the lever comprises a locking element and a lever upper part, wherein a fastening element for fastening on a valve and for connection to the locking plate is arranged on the lever upper part and the locking plate comprises a receiving opening for receiving the fastening element, characterized in that the receiving opening is realized in an oval manner and the fastening element comprises a round cross-sectional area or the fastening element comprises an oval cross-sectional area and the receiving opening is realized in a round manner, wherein the oval and round contour of the receiving opening preferably comprises at least one recess or slot.

14 Claims, 4 Drawing Sheets

(56) References Cited

U.S. PATENT DOCUMENTS

| | | | |
|---|---|---|---|
| 10,035,194 B2 | 7/2018 | Hunnekuhl et al. | |
| 2004/0222396 A1* | 11/2004 | Miklo | F16K 35/025 251/90 |
| 2012/0261602 A1 | 10/2012 | Sisk | |

* cited by examiner

HAND LEVER

CROSS-REFERENCE TO RELATED APPLICATION

This application claims the benefit and priority of EP 18 152 343.2 filed Jan. 18, 2018. The entire disclosure of the above application is incorporated herein by reference.

BACKGROUND OF THE INVENTION

The invention relates to a hand lever, preferably produced from plastics material, for operating a valve, preferably a butterfly valve or a ball valve, including a lever and a locking plate, wherein the lever comprises a locking element and a lever upper part, wherein a fastening element for fastening on the valve and for connection to the locking plate is arranged on the lever upper part and the locking plate comprises a receiving opening for receiving the fastening element.

Valves can be opened or closed or also just partially opened by means of a hand lever. As a rule, the closure body is rotated in the valve housing as a result of operating the hand lever in order to control the flow rate. Such hand levers are mostly used for butterfly valves as they require a higher force for operation. However, hand levers are also conceivable for ball valves or other valves which need no more than one turn about the axis of the closure body and do not demand multiple turns of the closure body.

WO2008105056 discloses such a hand lever for operating a butterfly valve, the disadvantage here being that a plurality of individual parts is necessary for mounting and screw heads which protrude present a risk of injury.

EP 0 702 177 A1 discloses a butterfly valve with a hand lever which is able to be adjusted, on the one hand, in a stepped manner via a latching means and, on the other hand, also in a stepless manner. The disadvantage in this connection is that the lever comprises many protruding edges which present a risk of injury.

It is the object of the invention to propose a hand lever which, to avoid injuries, does not comprise any protruding screws or sharp edges and is able to be mounted in a simple, quick and reliable manner on the valve.

Said object is achieved according to the invention in that the receiving opening is realized in an oval manner and the fastening element comprises a round cross-sectional area or the fastening element comprises an oval cross-sectional area and the receiving opening is realized in a round manner, wherein the oval and round contour of the receiving opening preferably comprises at least one recess or slot.

The hand lever for operating a valve, preferably a butterfly valve or a ball valve, is preferably realized from plastics material. The hand lever can also be used for other valves but is used in a preferred manner for those which comprise a 90° angle of operation, the hand lever would also be able to function for those with an angle of operation of 180° or of even up to 360°.

The hand lever is most often provided on a valve if it requires a higher force for operation.

The hand lever according to the invention comprises a lever which includes a locking element and a lever upper part. In a preferred manner, both lever upper part and locking plate are produced from plastics material. In a preferred design of the lever, the locking element and also the lever upper part comprise a bearing arrangement element, as a result of which the locking element is mounted so as to be movable in the lever upper part. A reverse arrangement of the bearing arrangement would obviously also be conceivable. The achievement here is that the front region of the locking element is distanced from the lever upper part during operation or during the compressing of the lever upper part and locking element in the rear region, as a result of which the toothing, which is arranged on the end face of the locking element, is disengaged from the corresponding toothing on the outer circumference of the latching disc and thus an adjustment of the lever or of the closure body of the valve is made possible, as a result of which the flow rate is controlled.

A resilient element, which ensures that when the lever is not operated, the toothing of the locking element engages the locking plate and the locking element cannot disengage from the toothing without the lever being operated, is preferably arranged between the lever upper part and the locking element.

As an alternative design of the hand lever, it is also possible to adjust the lever or the closure body without any latching such that each position is able to be set. This is made possible by the locking element which is arranged on the lever upper part and clamps the lever upper part with the locking plate, for example by means of a locking screw which is arranged on the locking element.

The hand lever comprises a locking plate, preferably produced from plastics material, the fastening element, which is arranged on the lever upper part, serving for connection to the locking plate. In addition, the lever upper part or the fastening element is connected to the valve or to the rotational axis of the closure body, preferably by means of a positive locking connection such as, for example, by means of a polygon. For connecting the fastening element to the locking plate, the locking plate, which is realized as a disc, comprises a receiving opening which is arranged in the centre. As a result of the receiving opening having an oval contour, the fastening element, which comprises a round cross-sectional area and preferably a cylindrical design, is able to be pushed through it or the contour of the receiving opening is realized in a round manner and the fastening element comprises an oval cross-section area which is also designed in a cylindrical manner. At least one recess or slot, which makes it possible to mount and lock the fastening element, is preferably situated in the contour of the receiving opening.

The fastening element is preferably realized in a cylindrical manner and preferably comprises at least one cam, the cam corresponding with the recess which is provided in the receiving opening and thus is simple to mount.

As a preferred embodiment, the fastening element comprises at least two cams which are preferably arranged offset to one another by 45°-180°, in an especially preferred manner, the cams are arranged situated opposite one another.

Such an arrangement makes it possible for the cams also to serve as a means for limiting the rotational movement and to be present at the stop of the locking plate when the valve is completely open or closed.

A preferred embodiment is that the oval contour of the receiving opening is formed by two circular contours which are arranged eccentrically to one another. This makes it possible for the fastening element only to be able to be mounted in one position or alignment with the locking plate and, as a result of a rotation and displacement of the fastening element in the receiving opening of the locking plate, ensures that the lever upper part is not able to disengage from the valve without detaching the locking plate, which has been screw-connected to the valve housing.

SUMMARY OF THE INVENTION

It is advantageous when the oval contour is realized as an elongated hole. The circular contours are preferably arranged spaced apart from one another along a common axis.

It has also proved to be advantageous when the circular contours comprise the same radius, this simplifies the mounting of the fastening element.

According to a preferred embodiment, the locking plate comprises at least one stop which is arranged in the region of the receiving opening and preferably corresponds with the cam on the fastening element and, as a result, limits the rotation of the lever. The angle of rotation which is possible with the hand lever is able to be limited corresponding to the position of the stop. Protruding limiting means or screw heads, which represent a risk of injury, are able to be avoided as a result of the arrangement of at least one stop on the locking plate. The stop is preferably realized in one piece with the locking plate or is arranged integrally on the locking plate.

It has been shown as particularly preferred when two stops for the rotational movement are arranged on the locking plate, the one stop preferably limits the fully open state of the valve and the other the completely closed state of the valve. It is advantageous when the one stop corresponds with the one cam for limiting the rotational movement and the other stop with the other cam for limiting the rotational movement.

In order to make stepless adjustment of the through-opening of the valve possible, the locking plate preferably comprises, on the outer circumference thereof, a toothing with which the toothing on the end face of the locking element corresponds. It is advantageous when the toothing is only arranged over a region of a circular segment of the outer circumference of the locking plate. It is only necessary to arrange a toothing over the outer circumference insofar as the angle of operation of the valve is also.

An exemplary embodiment of the invention is described by way of the figures, the invention not being limited to only the exemplary embodiment. The figures are as follows:

DRAWINGS

Figure 3:
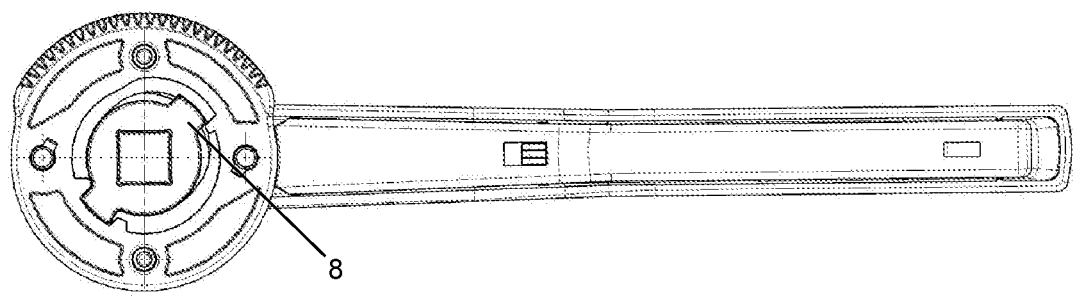
Figure 4:
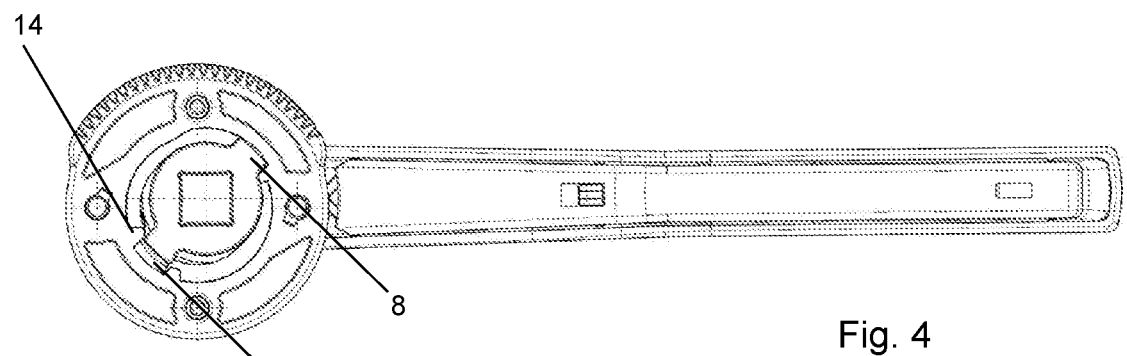
Figure 5:
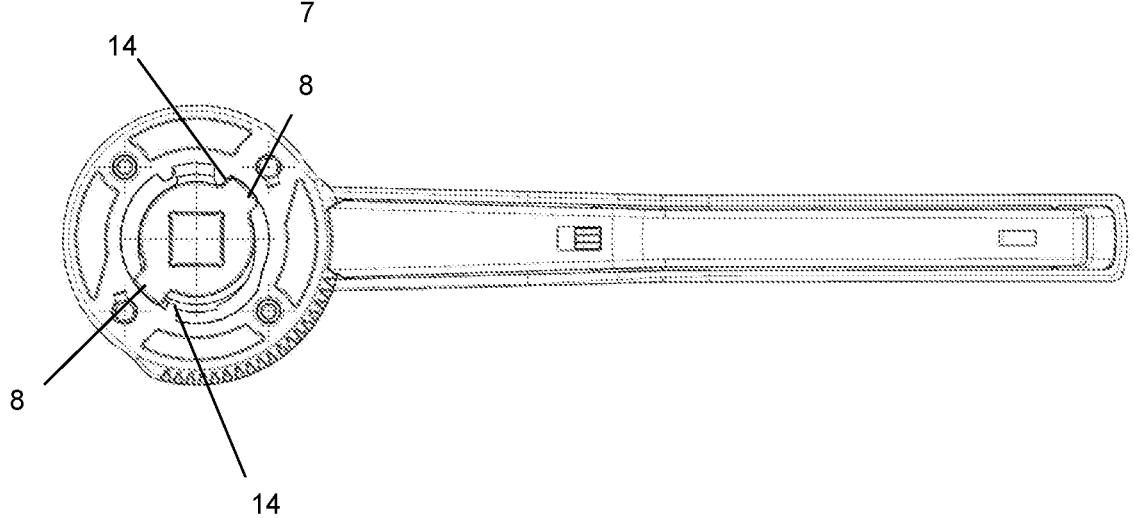
Figure 6:
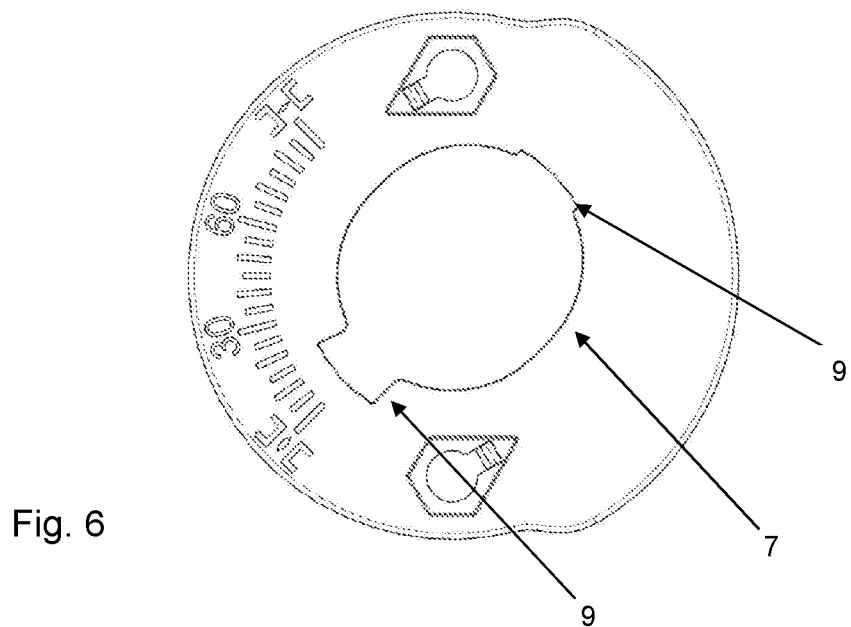
Figure 7:
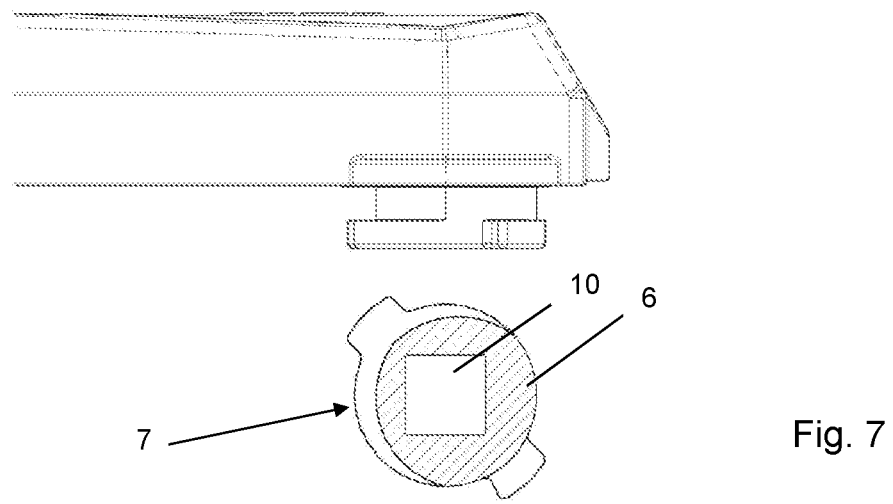
Figure 8:
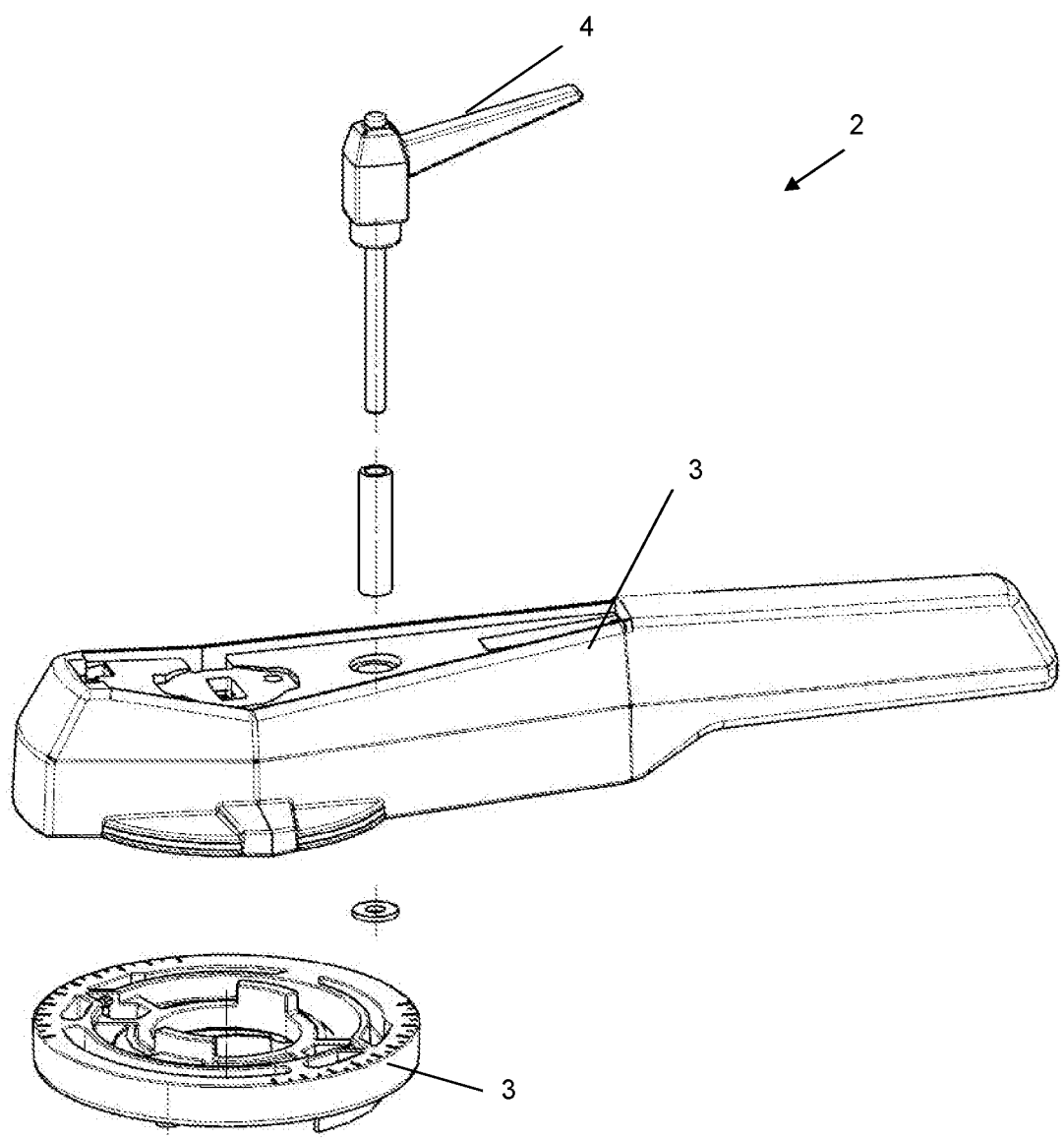

FIG. 3 shows a view from below of the hand lever according to the invention during the insertion of the fastening element into the locking plate, FIG. 4 shows a view from below of the hand lever according to the invention with the locking plate latched, FIG. 5 shows a view from below of the hand lever according to the invention already rotated, FIG. 6 shows a top view of a locking plate, FIG. 7. shows a detail of a lever according to the invention with a fastening element which comprises an oval cross-sectional area and FIG. 8 shows an exploded view of a further embodiment of a hand lever according to the invention with a lever.

DETAILED DESCRIPTION OF THE PREFERRED EMBODIMENTS

Figure 1:
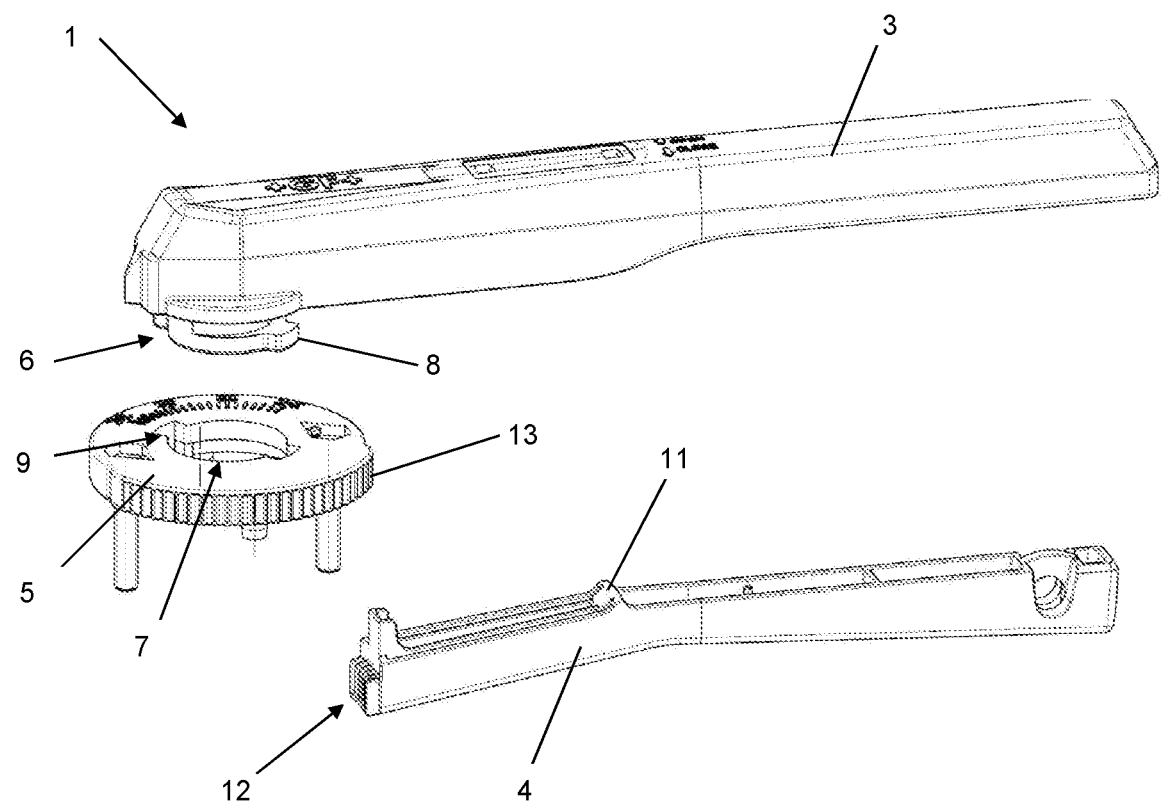
FIG. 1 shows an exploded view of a hand lever according to the invention.

FIG. 1 shows an exploded view of a hand lever 1 according to the invention. The hand lever 1 comprises a lever 2 which includes a lever upper part 3 and a locking element 4, the upper part and the locking element 4 are preferably produced from plastics material. As an alternative to this, a further embodiment of a hand lever 1 according to the invention is shown in FIG. 8, the locking element 4 being realized as a lever and thus allowing the hand lever 1 to be locked without latching, but rather only by clamping on the locking plate 5, for example with a screw and nut for fixing. In addition, the hand lever 1 comprises a locking plate 5 which serves for the receiving and fastening of the lever 2 or of the lever upper part 3. A fastening element 6, which is latched with the locking plate 5, is arranged on the front end of the lever upper part 3. The fastening element 6 preferably comprises a cylindrical form, the fastening element 6 being able to be pushed through the receiving opening 7 of the locking plate 5 and the cams 8, which are preferably arranged thereon, corresponding with the recesses or slots 9 which are preferably arranged in the receiving opening 7, this is shown in FIG. 3. The fastening element 6 can comprise a round cross-sectional area and correspond with a receiving opening 7 which comprises an oval form, as shown in FIGS. 1-7 or, as an alternative to this, the fastening means 6 comprises an oval cross-sectional area and the corresponding receiving opening is realized in a round manner as shown in FIG. 7. By the receiving opening 7 comprising an oval contour, which is preferably formed by two circular contours which are arranged eccentrically with respect to one another, the fastening element 6, once it has been pushed through the locking plate 5, is displaced eccentrically so that the cam 7 is able to be rotated past the one stop 14, as can be seen in FIGS. 3 and 4, and then is able to be displaced back again, as shown in FIG. 5, a rotation already being effected here. FIG. 5 shows how the one cam 7 is present on the one stop 14, which serves as a rotational limiter in one direction, and the other cam 7 on the other stop 14 serves for limiting the rotation in the other direction. The lever 2 is not able to come loose as a result of the fastening element 6 being mounted on the locking plate 5 and the locking plate 5 being screw-connected with the valve in this manner (not shown).

For connection to the valve or to the axis of the closure body, the lever upper part 3 comprises a receiving means 10 in the fastening element 6, which receiving means is preferably connected in a positive locking manner to the axis of the closure body, the receiving means 10 preferably being realized as a polygon.

The hand lever from FIG. 1 has been shown as a preferred design, the lever upper part 3 and locking element 4 preferably being connected together by means of a bearing element 11. It is advantageous when the locking element 4 is mounted in the upper part 3 and the toothed end face 12 of the locking element 4 is lowered and released from the toothing of the locking plate 5 as a result of compressing the rear region of the lever upper part 3 and locking element 4, which makes it possible to rotate the lever 2 and the valve is thus able to be opened or closed. Said embodiment is used in most cases whenever latching 13 is required, if a fine-adjustable hand lever 1 without latching is preferred, the embodiment shown in FIG. 8, in which the lever above the lever upper part 3 serves as locking element 4, is implemented.

Figure 2:
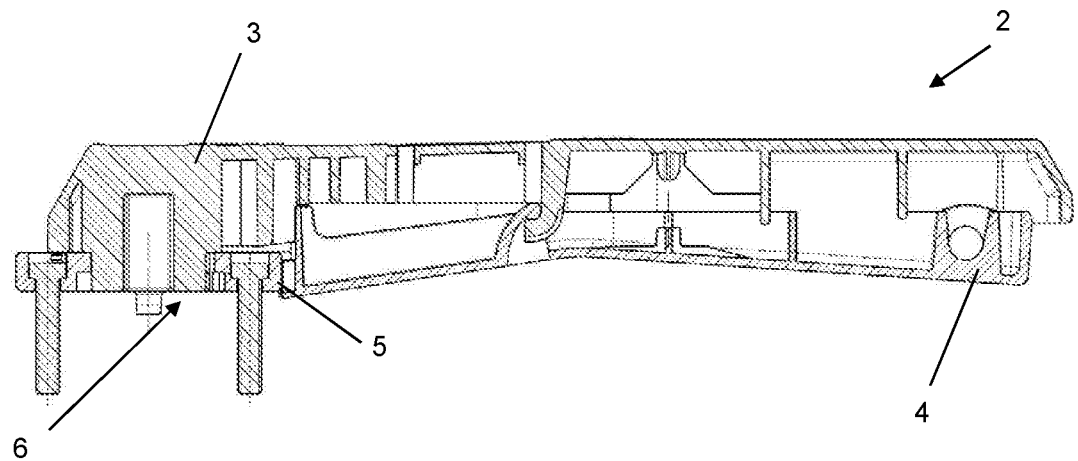
FIG. 2 shows a longitudinal section of a hand lever according to the invention.

FIG. 2 shows a longitudinal section of the hand lever 1 in which the bearing element 11 of the levers 3, 4 is easy to see. In order to hold the lever upper part 3 and the locking element 4 under tension in the normal state or when not being operated and to hold the toothing on the end face 12 of the locking element in engagement with the toothing 13 of the locking plate 5, a spring element (not shown) is preferably installed between the lever upper part and lower part and provides for maintaining the tension.

The cam 8, preferably cams 8, which is/are arranged on the fastening element 6, also serves/serve, along with its/their role of fastening, as means for limiting the rotational movement. The cams 8 serve by means of at least one stop 14 for limiting the rotational movement of the lever, the stop 14 being arranged in the region of the receiving opening 7 of the latching element 5, this role is easy to see in FIGS. 4 and 5. It is obviously also possible for two stops 14 to be arranged, as can be seen in the figures, the one cam 8 with the one stop 14 then serving as limiting means for one direction of rotation and the other cam 8 with the other stop 14 serving for limiting in the other direction. The cams 8 and the recesses 7, through which they are pushed, are coded in such a manner that it is not possible to mount the lever incorrectly about 180°, this is preferably achieved as a result of the two cams 8 and recesses 7 having varying widths.

What is claimed is:

1. A hand lever produced from plastics material for operating a valve including a lever and a locking plate, the lever comprising:
    a locking element and a lever upper part,
    wherein a fastening element for fastening on a valve and for connection to the locking plate is arranged on the lever upper part and the locking plate comprises a receiving opening for receiving the fastening element,
    wherein one of the receiving opening and the fastening element is oval without a straight edge, and a different one of the receiving opening and the fastening element includes a round cross-sectional area,
    wherein the receiving opening includes at least one recess or slot, and
    wherein the hand lever is connected to the locking plate by way of cooperation between the fastening element and the receiving opening with the fastening element seated within the receiving opening.

2. The hand lever according to claim 1, wherein at least two cams are arranged on the fastening element and they are arranged offset to one another.

3. The hand lever according to claim 2, wherein the cams are situated opposite one another.

4. The hand lever according to claim 2, wherein the at least two cams are offset to one another by 45°-180°.

5. The hand lever according to claim 1, wherein the oval contour of the receiving opening is formed by two circular contours which are arranged eccentrically to one another.

6. The hand lever according to claim 5, wherein the two circular contours comprise the same radius.

7. The hand lever according to claim 1, wherein the oval contour is realized as an elongated hole.

8. The hand lever according to claim 1, wherein the locking plate comprises at least one stop in the region of the receiving opening for limiting the rotation of the lever.

9. The hand lever according to claim 8, wherein the locking plate comprises at least two stops in the region of the receiving opening for limiting the rotation of the lever, the one stop limits the fully open state of the valve and the other the completely closed state of the valve.

10. The hand lever according to claim 1, wherein the locking plate comprises a gearing on the outer circumference.

11. The hand lever according to claim 10, wherein the gearing is arranged over a region of a circular segment of the outer circumference.

12. The hand lever according to claim 1, wherein at least one cam for latching with the locking plate is arranged on the fastening element.

13. A valve operating assembly for operating a valve, the valve operating assembly comprising:
    a locking plate configured to be screw-connected to the valve;
    a hand lever configured to cooperate with the locking plate, the hand lever made of plastic and including:
        a lower locking element;
        an upper part coupled to the lower locking element;
        a fastening element included with the upper part, the fastening element configured for connection to the locking plate;
    wherein the locking plate includes a receiving opening configured to receive the fastening element of the hand lever;
    wherein one of the receiving opening and the fastening element is oval without a straight edge, and another one of the receiving opening and the fastening element includes a round cross-sectional area;
    wherein the receiving opening includes at least one recess or slot; and
    wherein the hand lever is connected to the locking plate by way of cooperation between the fastening element and the receiving opening with the fastening element seated within the receiving opening.

14. A valve operating assembly for operating a valve, the valve operating assembly comprising:
    a locking plate configured to be screw-connected to the valve;
    a hand lever configured to cooperate with the locking plate, the hand lever made of plastic and including:
        a lower locking element;
        an upper part coupled to the lower locking element;
        a fastening element included with the upper part, the fastening element configured for connection to the locking plate;
    wherein the locking plate includes a receiving opening configured to receive the fastening element of the hand lever;
    wherein the hand lever is connected to the locking plate by way of cooperation between the fastening element and the receiving opening with the fastening element seated within the receiving opening;
    wherein one of the receiving opening and the fastening element is oval without a straight edge, and another one of the receiving opening and the fastening element includes a round cross-sectional area; and
    wherein the locking plate defines a first stop and a second stop at the receiving opening for limiting rotation of the hand lever, the first stop limits rotation to a completely open state and the second stop limits rotation to a completely closed state.

* * * * *